United States Patent [19]

Jolly

[11] Patent Number: 5,762,350
[45] Date of Patent: Jun. 9, 1998

[54] HAND OPERATED WHEEL CHAIR OR EXERCISE MACHINE USING RACKS OPERATED BY VARIABLE LENGTH LEVER

[76] Inventor: Frank H. Jolly, 1832 Glendale Dr., Arcata, Calif. 95519-9219

[21] Appl. No.: 595,526

[22] Filed: Feb. 1, 1996

[51] Int. Cl.⁶ ............................................. A63B 69/06
[52] U.S. Cl. ........................ 280/245; 280/246; 280/252; 280/253
[58] Field of Search ......................... 280/249, 233, 280/242.1, 244, 245, 246, 240, 253, 251, 252, 288.1, 282, 234, 254, 243; 482/57, 62; 74/130, 131, 29

[56] References Cited

U.S. PATENT DOCUMENTS

| | | | |
|---|---|---|---|
| 1,536,788 | 5/1925 | Grady | 280/246 |
| 4,811,964 | 3/1989 | Horn | 280/246 |
| 5,272,928 | 12/1993 | Young | 280/246 |
| 5,542,893 | 8/1996 | Petersen et al. | 74/131 |
| 5,653,663 | 8/1997 | Mccahon | 74/131 |

*Primary Examiner*—Brian L. Johnson
*Assistant Examiner*—Gary Savitt

[57] ABSTRACT

This improvement is for a hand operated wheel chair or exercise machine. The machine uses two racks to operate two one way clutches to furnish forward motion from both the forward and backward strokes of the input lever arm. The mechanical advantage of the input lever arm is readily changeable to affect the overall gear ratio of the drive. Steering is accomplished by turning a wheel on the lever arm. The control is similar to that on a wheel controlled airplane.

4 Claims, 3 Drawing Sheets

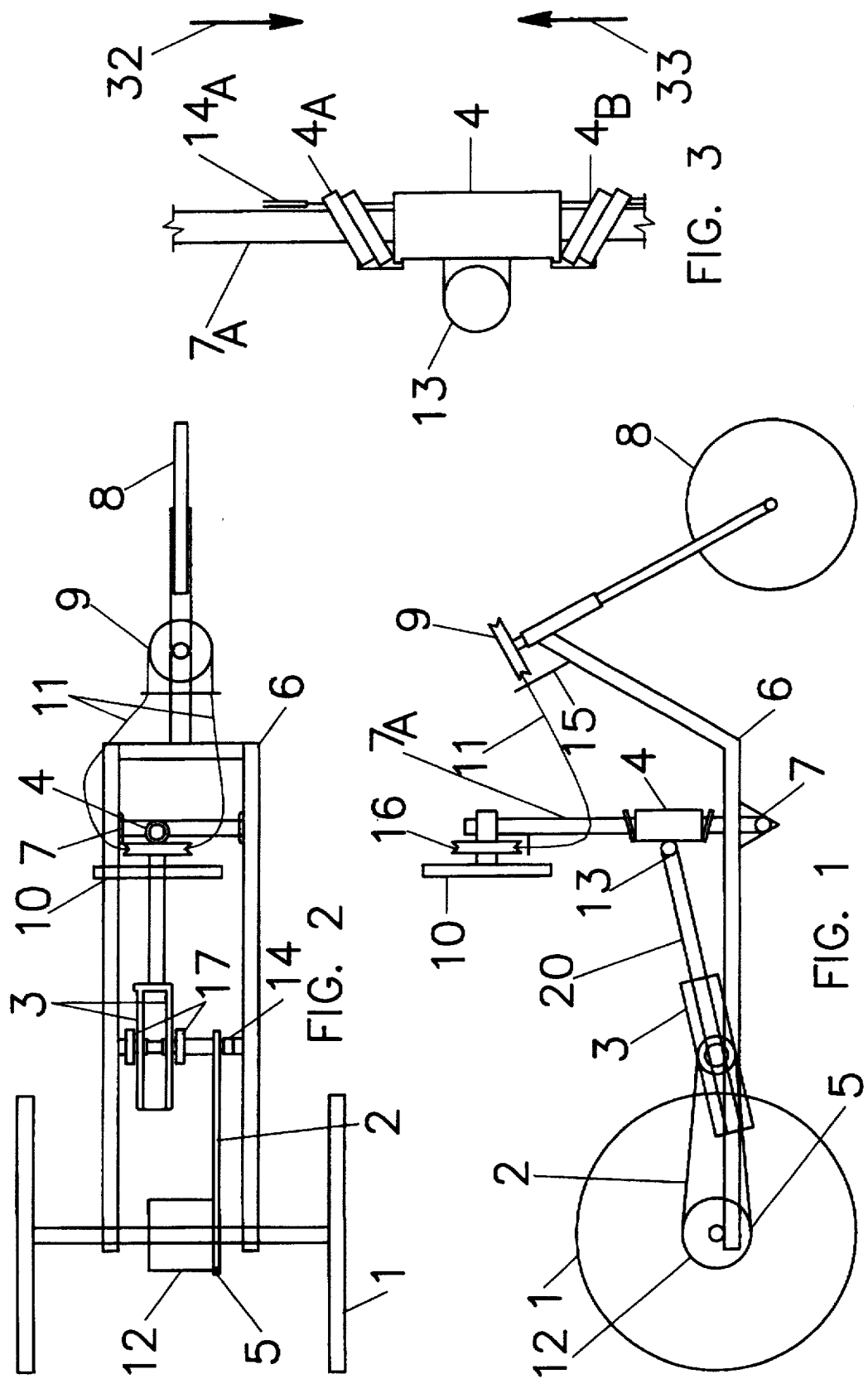

HAND OPERATED WHEEL CHAIR OR EXERCISE MACHINE USING RACKS OPERATED BY VARIABLE LENGTH LEVER

BACKGROUND OF INVENTION

Many types of wheel chairs or exercise machines exist but none of them offer a simple way to make an all terrain wheel chair with simple arm motion power input. The following U.S. prior patents have been found in searches, but none of them provide a simple cheap easy to use chair: U.S. Pat. Nos. 4,811,964; 4,892,323; 5,020,815; 5,020,818; 5,036,937; 5,149,118; 5,167,168; 5,240,277; 5,232,236; 5,236,398; 5,241,876; 5,312,126; 5,312,127; 5,322,312; 5,301,971; 5,308,098.

SUMMARY OF INVENTION

This invention is a two wheel drive all terrain wheel chair or exercise machine that is powered by pushing and pulling on a wheel. The wheel also steers the chair by being turned while it is being pumped.

It has a step-less transmission which changes its input lever advantage to facilitate torque multiplication. The output lever arm is lengthened or shortened by sliding the output bearing mount up and down the lever to which the steering wheel is attached.

Power is transmitted to the wheels on both the push and the pull strokes of the steering wheel. Power is put onto a jack shaft by using two racks to turn two one way clutches through attached gears. One rack turns a one way clutch in its locked direction on the pull stroke, and the other rack turns a separate one way clutch in its locked direction on the push stroke. Both clutches combine to turn the jack shaft in the correct forward direction on each stroke.

The chair is steered and shifted by using small diameter pull cables in its preferred configuration.

BRIEF DESCRIPTION OF THE SEVERAL VIEWS OF THE DRAWING

FIG. 1: Side view of the assembled wheel chair showing the position and the interaction of its several parts.

FIG. 2: Top view of the assembled wheel chair showing the position and the interaction of its several parts.

FIG. 3: An enlargement of the output bearing sleeve; this illustrates & shows how two 'bar clamp clutches' are used to restrain and position the sliding mount.

DETAILED DESCRIPTION

Figure 5:
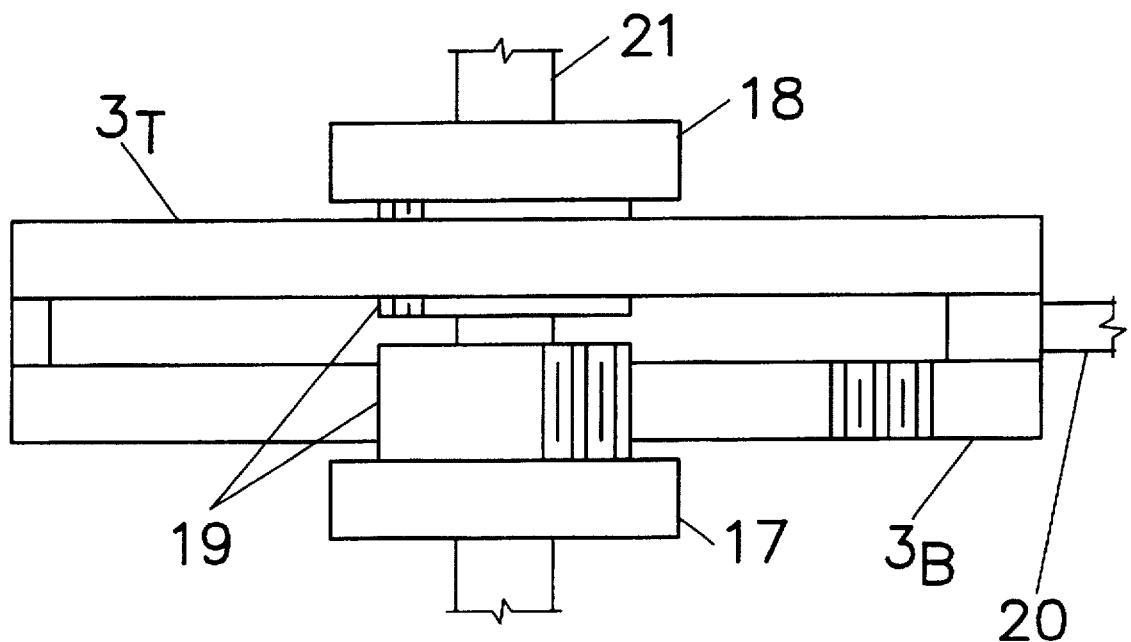
FIG. 5: Top view of the input racks intermeshed with their respective clutches.

This invention is an improvement in the design of an arm operated wheel chair or exercise machine wherein a lever arm is used to provide forward motion.

A seat would be mounted to frame 6; the seat has been omitted.

Referring in detail to FIGS. 1 and 2: Wheel 10 is used to pump lever arm 7A back and forth. Lever arm 7A moves sleeve 4. Bearing 13 moves interconnector bar 20. Interconnector bar 20 moves racks 3.

Racks 3 are used to rotate one way clutch 17 which rotates sliding output dog clutch 14. Sliding output dog clutch 14 turns chain 2 which turns sprocket 5. Sprocket 5 is attached to differential 12. Differential 12 turns wheels 1 to provide forward motion. Extra sprockets can be included at 5 for changing final gear ratio.

The wheel chair is steered by turning wheel 10 which turns input cable wheel 16. Input cable wheel 16 shortens and lengthens cables 11 to turn output cable wheel 9. Output cable wheel 9 turns wheel 8 to steer the chair.

FIG. 3 is an enlargement of sliding output bearing sleeve 4. It shows lever arm 7A and bearing 13. Bearing 13 is attached to sleeve 4. Sleeve 4 is locked in position by "bar clamp clutches" 4A and 4B. ("Bar clamp clutches" are hardened washers with a center hole larger than the shaft they are placed around. When cocked and held in that position, they bind and prevent movement between their retainer and shaft. These clutches are normally used on pipe-style bar clamps.) Bar clamp clutches 4A stop sleeve 4 from sliding in direction of arrow 32. Bar clamp clutches 4B stop sleeve 4 from sliding in the direction of arrow 33.

Bar clamp clutches 4A are released by cable 14A. Cable 14A pushes bar clamp clutches 4A down against sleeve 4 allowing sleeve 4 to slide down the lever arm 7A toward bearing 7 in FIG. 1. Releasing bar clamp clutches 4A and pushing lever arm 7A toward wheel 8 in FIG. 1 slides sleeve 4 down lever arm 7A and increases the torque output of lever arm 7A at bearing 13. Releasing bar clamp clutches 4B allow sleeve 4 to slide up lever arm 7A when lever arm 7A is pulled toward differential 12 in FIG. 1.

Figure 4:
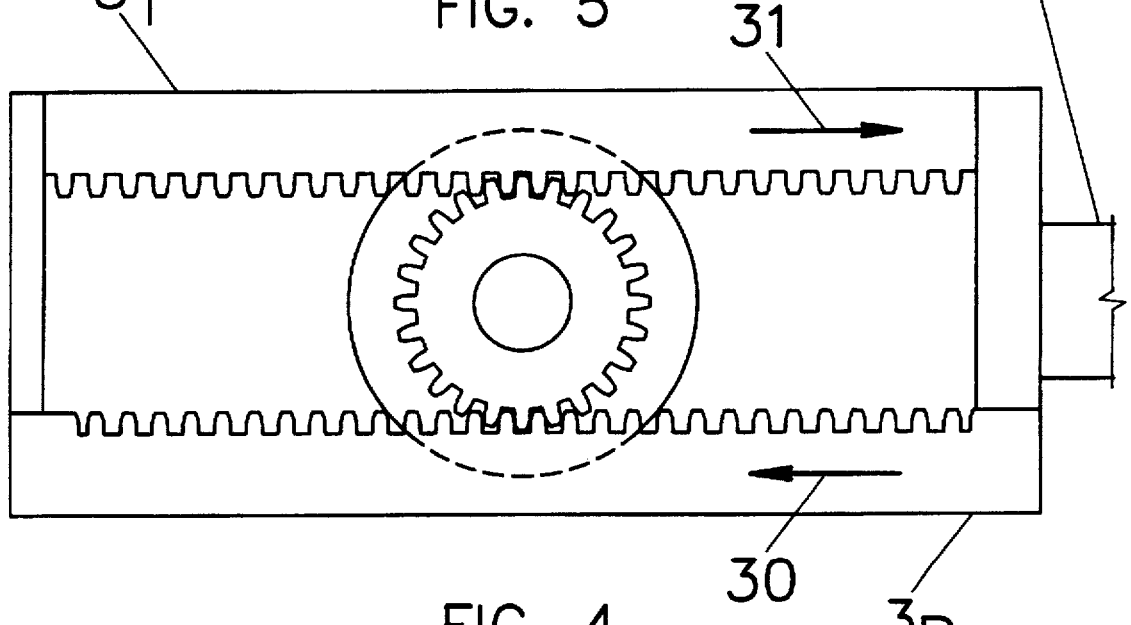
FIG. 4: Side view enlargement of the input racks intermeshed with the clutches.

FIGS. 4 and 5 depict racks 3T and 3B which are used to drive one way clutches 17 and 18. When rack 3B is moved in the direction of arrow 30, it rotates its gear 19 in a clockwise direction and drives clutch 17 in a clockwise direction. Clutch 17 is locked in a clockwise direction, so shaft 21 is driven in a clockwise direction.

When rack 3T is moved in the direction of arrow 31, it rotates its gear 19 in a clockwise direction. Gear 19 drives clutch 18 in a clockwise direction. Clutch 18 is locked in a clockwise direction, so shaft 21 is driven in a clockwise direction.

Clutches 17 and 18 are one way clutches and can be one of many types; some choices are ramp and roller, sprague, ratchets, mechanical diodes and overrunning starter drives off of engine starters. These clutches are not limited to these types.

Figure 6:
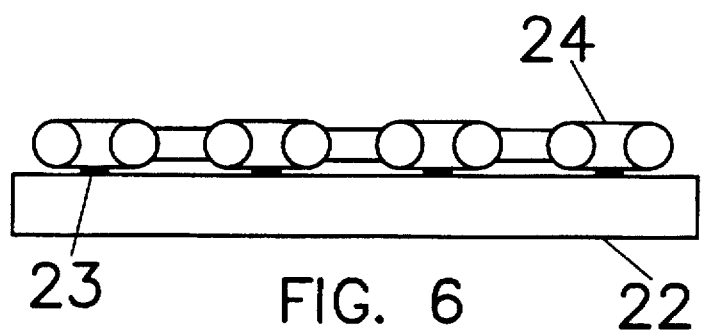
FIG. 6: An alternate style of rack formed by appropriately fastening a length of roller chain to a stiffening bar.

FIG. 6 illustrates a second type of rack. This rack is formed by adequately attaching roller chain to a rigid backing. These racks drive sprockets which are attached to one way clutches. Roller chain 24 can be welded or bolted at 23 to bar 22.

Figure 7:
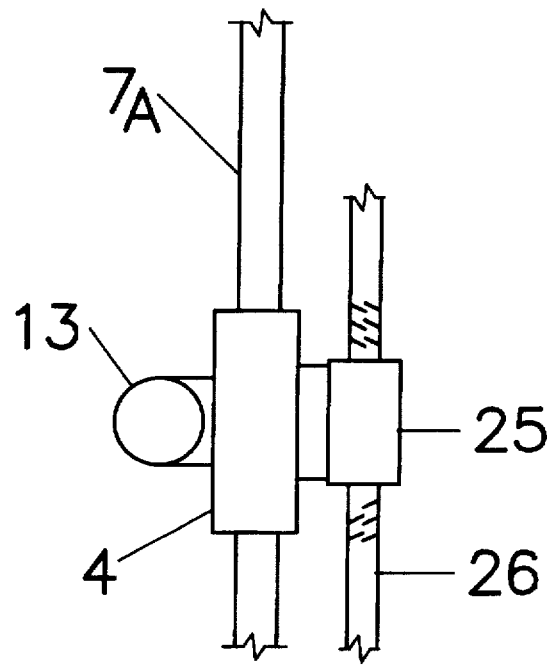
FIG. 7: An enlargement of the output bearing mount using a worm gear shaft and a worm nut to restrain and position the sliding mount.

FIG. 7 is an alternate style of retaining and adjusting sliding output bearing sleeve 4. Threaded shaft 26 is rotated to move nut 25. Nut 25 slides sleeve 4 on lever arm 7A. The pitch of the thread locks sleeve 4 in place until the threaded shaft is turned.

Figure 8:
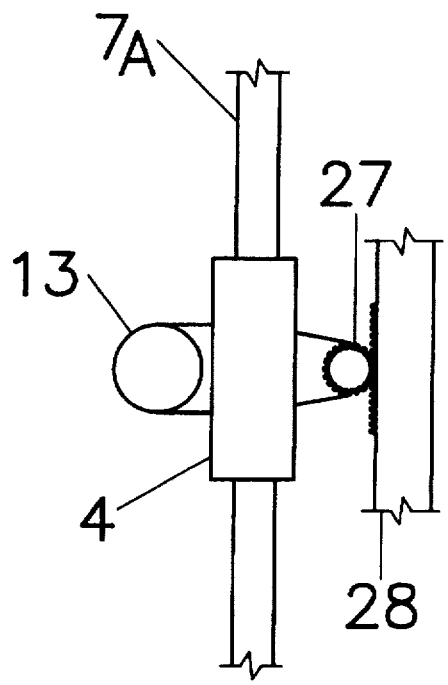
FIG. 8: An enlargement of the output bearing mount using a rack and pinion to restrain and position the sliding mount.

FIG. 8 is an alternate style of positioning and adjusting sliding output, bearing sleeve 4. Rack 28 is fastened to lever arm 7A. Pinion gear 27 is turned to position sleeve 4 along rack 28. Sleeve 4 is moved by the pinion gear 27 along lever arm 7A.

What is claimed:

1. A vehicle comprising:
   a vehicle frame assembly;
   a plurality of wheels attached to said vehicle frame assembly;
   a steering wheel assembly attached to the vehicle and including a steering wheel and including a lever arm with two opposite ends, one end of said lever arm attached to the steering wheel and the other end of said lever arm attached to the vehicle and wherein said steering wheel assembly permits steering at least one of the plurality of wheels and wherein the vehicle can be propelled by pushing the steering wheel assembly back and forth;
   a transmission assembly including two racks, two gear driven one way clutches, a jack shaft, a dog clutch controlled chain drive, and a differential;
   the two racks operating the two gear driven one way clutches wherein the two racks and two gear driven one way clutches are adapted to respond to a steering assembly back and forth motion and whereby a reciprocating motion of the steering wheel assembly is transformed to a rotary motion by the two racks operating the two gear driven one way clutches and wherein one of said gear driven one way clutches locks on a pull stroke and the other gear driven one way clutch locks on a reverse stroke of the steering wheel assembly and wherein the gear driven one way clutches rotate the jack shaft to transfer power to at least one wheel of the plurality of wheels through the dog clutch controlled chain drive and the differential;
   said dog clutch controlled chain drive being capable of multiple gear ratios;
   a lever arm output portion slidably attached to said lever arm at a predetermined position on said lever arm and wherein said lever arm output portion is held in place on said lever arm by two bar clamp washer clutches and wherein said predetermined position of said lever arm output portion can be varied;
   said back and forth motion of said steering wheel assembly applying an amount of torque through said lever arm and through said lever arm output portion to said transmission assembly and wherein the amount of torque can be varied by varying the predetermined position of the lever arm output portion on said lever arm;
   two pull cables;
   each of said pull cables having two opposite ends, one end of each pull cable attached to the steering wheel assembly and the other end of each pull cable attached to the vehicle frame assembly and whereby rotation of the steering wheel will apply a steering force to at least one of the plurality of wheels through said pull cables.

2. A vehicle comprising:
   a vehicle flame assembly;
   a plurality of wheels attached to said vehicle frame assembly;
   a steering wheel assembly attached to the vehicle and including a steering wheel and including a lever arm with two opposite ends, one end of said lever arm attached to the steering wheel and the other end of said lever arm attached to the vehicle and wherein said steering wheel assembly permits steering at least one of the plurality of wheels and wherein the vehicle can be propelled by pushing the steering wheel assembly back and forth;
   a transmission assembly including two roller chain assemblies wherein each roller chain assembly includes a roller chain fastened to a stiffening member, said transmission assembly further including two sprocket driven one way clutches, a jack shaft, a dog clutch controlled chain drive, and a differential;
   the two roller chain assemblies operating the two sprocket driven one way clutches wherein the two roller chain assemblies and two sprocket driven one way clutches are adapted to respond to a steering assembly back and forth motion and whereby a reciprocating motion of the steering wheel assembly is transformed to a rotary motion by the two roller chain assemblies operating the two sprocket driven one way clutches and wherein one of said sprocket driven one way clutches locks on a pull stroke and the other sprocket driven one way clutch locks on a reverse stroke of the steering wheel assembly and wherein the sprocket driven one way clutches rotate the jack shaft to transfer power to at least one wheel of the plurality of wheels through the dog clutch controlled chain drive and the differential;
   said dog clutch controlled chain drive being capable of multiple gear ratios;
   a lever arm output portion slidably attached to said lever arm at a predetermined position on said lever arm and wherein said lever arm output portion is held in place on said lever arm by two bar clamp washer clutches and wherein said predetermined position of said lever arm output portion can be varied;
   said back and forth motion of said steering wheel assembly applying an amount of torque through said lever arm and through said lever arm output portion to said transmission assembly and wherein the amount of torque can be varied by varying the predetermined position of the lever arm output portion on said lever arm;
   two pull cables;
   each of said pull cables having two opposite ends, one end of each pull cable attached to the steering wheel assembly and the other end of each pull cable attached to the vehicle frame assembly and whereby rotation of the steering wheel will apply a steering force to at least one of the plurality of wheels through said pull cables.

3. A vehicle comprising:
   a vehicle frame assembly;
   a plurality of wheels attached to said vehicle frame assembly;
   a steering wheel assembly attached to the vehicle and including a steering wheel and including a lever arm with two opposite ends, one end of said lever arm attached to the steering wheel and the other end of said lever arm attached to the vehicle and wherein said steering wheel assembly permits steering at least one of the plurality of wheels and wherein the vehicle can be propelled by pushing the steering wheel assembly back and forth;
   a transmission assembly including two racks, two gear driven one way clutches, a jack shaft, a dog clutch controlled chain drive, and a differential;
   the two racks operating the two gear driven one way clutches wherein the two roller chain assemblies and two gear driven one way clutches are adapted to respond to a steering assembly back and forth motion and whereby a reciprocating motion of the steering wheel assembly is transformed to a rotary motion by the two racks operating the two gear driven one way clutches and wherein one of said gear driven one way clutches locks on a pull stroke and the other gear driven one way clutch locks on a reverse stroke of the steering wheel assembly and wherein the gear driven one way clutches rotate the jack shaft to transfer power to at least one wheel of the plurality of wheels through the dog clutch controlled chain drive and the differential;

said dog clutch controlled chain drive being capable of multiple gear ratios;

a lever arm output portion slidably attached to said lever arm at a predetermined position on said lever arm and wherein said lever arm output portion is held in place on said lever arm by a screw shaft and a screw nut and wherein said predetermined position of said lever arm output portion can be varied;

said back and forth motion of said steering wheel assembly applying an amount of torque through said lever arm and through said lever arm output portion to said transmission assembly and wherein the amount of torque can be varied by varying the predetermined position of the lever arm output portion on said lever arm;

two pull cables;

each of said pull cables having two opposite ends, one end of each pull cable attached to the steering wheel assembly and the other end of each pull cable attached to the vehicle frame assembly and whereby rotation of the steering wheel will apply a steering force to at least one of the plurality of wheels through said pull cables.

4. A vehicle comprising:

a vehicle frame assembly;

a plurality of wheels attached to said vehicle frame assembly;

a steering wheel assembly attached to the vehicle and including a steering wheel and including a lever arm with two opposite ends, one end of said lever arm attached to the steering wheel and the other end of said lever arm attached to the vehicle and wherein said steering wheel assembly permits steering at least one of the plurality of wheels and wherein the vehicle can be propelled by pushing the steering wheel assembly back and forth;

a transmission assembly including two racks, two gear driven one way clutches, a jack shaft, a dog clutch controlled chain drive, and a differential;

the two racks operating the two gear driven one way clutches wherein the two roller chain assemblies and two gear driven one way clutches are adapted to respond to a steering assembly back and forth motion and whereby a reciprocating motion of the steering wheel assembly is transformed to a rotary motion by the two racks operating the two gear driven one way clutches and wherein one of said gear driven one way clutches locks on a pull stroke and the other gear driven one way clutch locks on a reverse stroke of the steering wheel assembly and wherein the gear driven one way clutches rotate the jack shaft to transfer power to at least one wheel of the plurality of wheels through the dog clutch controlled chain drive and the differential;

said dog clutch controlled chain drive being capable of multiple gear ratios;

a lever arm output portion slidably attached to said lever arm at a predetermined position on said lever arm and wherein said lever arm output portion is held in place on said lever arm by a gear rack and pinion gear and wherein said predetermined position of said lever arm output portion can be varied;

said back and forth motion of said steering wheel assembly applying an amount of torque through said lever arm and through said lever arm output portion to said transmission assembly and wherein the amount of torque can be varied by varying the predetermined position of the lever arm output portion on said lever arm;

two pull cables;

each of said pull cables having two opposite ends, one end of each pull cable attached to the steering wheel assembly and the other end of each pull cable attached to the vehicle frame assembly and whereby rotation of the steering wheel will apply a steering force to at least one of the plurality of wheels through said pull cables.

* * * * *